United States Patent [19]

Phillips et al.

[11] Patent Number: 5,346,678
[45] Date of Patent: Sep. 13, 1994

[54] PRODUCTION OF HIGH SPECIFIC ACTIVITY SILICON-32

[75] Inventors: Dennis R. Phillips, Los Alamos, N. Mex.; Mark A. Brzezinski, Santa Barbara, Calif.

[73] Assignee: The United States of America as represented by the United States Department of Energy, Washington, D.C.

[21] Appl. No.: 950,552

[22] Filed: Sep. 25, 1992

[51] Int. Cl.$^5$ .................. C01B 33/00; C01B 33/113; G21G 4/04
[52] U.S. Cl. ......................................... 423/2; 423/249; 423/325; 423/335; 423/339; 376/192; 376/195
[58] Field of Search .................. 423/2, 325, 335, 339, 423/249; 376/192, 195

[56] References Cited

U.S. PATENT DOCUMENTS

| | | | |
|---|---|---|---|
| 3,908,123 | 9/1975 | Veach et al. | 250/298 |
| 4,800,100 | 1/1989 | Herbots et al. | 427/38 |
| 4,824,537 | 4/1989 | Arai et al. | 204/157.22 |
| 4,885,149 | 12/1989 | DeFreitas et al. | 423/339 |
| 4,910,156 | 3/1990 | Takasu et al. | 437/17 |
| 5,057,269 | 10/1991 | Steinkruger et al. | 376/192 |

OTHER PUBLICATIONS

Polak et al., "A $^{32}$Si Source From Proton Spallation of Vanadium", Radiochimica Acta 38, 73–77 (1985).
Nelson et al., "Cycling of Biogenic Silica Within the Upper Water Column of the Ross Sea", Mar. Chem. 35 (1991) 461–476.
Brzezinski et al., "A Solvent Extraction Method For The Colormetric Determination of Nanomolar Concentrations of Silicic Acid in Seawater", Mar. Chem. 19: (1986) 139–151.

Primary Examiner—Edward A. Miller
Attorney, Agent, or Firm—Bruce H. Cottrell; William A. Eklund; William R. Moser

[57] ABSTRACT

A process for preparation of silicon-32 is provide and includes contacting an irradiated potassium chloride target, including spallation products from a prior irradiation, with sufficient water, hydrochloric acid or potassium hydroxide to form a solution, filtering the solution, adjusting pH of the solution to from about 5.5 to about 7.5, admixing sufficient molybdate-reagent to the solution to adjust the pH of the solution to about 1.5 and to form a silicon-molybdate complex, contacting the solution including the silicon-molybdate complex with a dextran-based material, washing the dextran-based material to remove residual contaminants such as sodium-22, separating the silicon-molybdate complex from the dextran-based material as another solution, adding sufficient hydrochloric acid and hydrogen peroxide to the solution to prevent reformation of the silicon-molybdate complex and to yield an oxidization state of the molybdate adapted for subsequent separation by an anion exchange material, contacting the solution with an anion exchange material whereby the molybdate is retained by the anion exchange material and the silicon remains in solution, and optionally adding sufficient alkali metal hydroxide to adjust the pH of the solution to about 12 to 13. Additionally, a high specific activity silicon-32 product having a high purity is provided.

14 Claims, No Drawings

PRODUCTION OF HIGH SPECIFIC ACTIVITY SILICON-32

FIELD OF THE INVENTION

The present invention relates to the fields of nuclear chemistry and radiochemistry. This invention is the result of a contract with the Department of Energy (Contract No. W-7405-ENG-36).

BACKGROUND OF THE INVENTION

The isotope of silicon having an atomic weight of 32 (Si-32) is useful, e.g., as a tracer for silicon, for dating of geological and cosmological processes and as a potential generator of the daughter nuclide phosphorus-32. Silicon-32 has previously been produced by: (1) spallation of vanadium with high energy protons, followed by extraction as molybdosilicic acid and purification by anion exchange; and (2) reaction of a sulfur target with protons from a synchrocyclotron, followed by recovery by distillation as $H_2SiF_6$ from a concentrated sulphuric acid solution. Each of the former processes used materials such as n-butanol or hydrofluoric acid that are undesirable to use either due to safety or to mixed waste disposal problems. Further, neither of the previous processes have been able to produce a high specific activity silicon-32 product.

Accordingly, it is an object of this invention to provide a silicon-32 product characterized as having a high specific activity, i.e., greater than about 300 Becquerels per microgram of silicon.

It is a further object of this invention to provide a process for production of silicon-32, preferably silicon-32 having a high specific activity.

SUMMARY OF THE INVENTION

To achieve the foregoing and other objects, and in accordance with the purposes of the present invention, as embodied and broadly described herein, the present invention provides a process for preparation of silicon-32 including contacting an irradiated potassium chloride target containing spallation products, with a sufficient amount of water, hydrochloric acid or potassium hydroxide to form a first solution containing at least about 25 grams per liter (g/l) of potassium chloride, filtering the first solution, adjusting pH of the filtered-first solution to within a range of from about 5.5 to about 7.5, admixing sufficient molybdate-reagent and hydrochloric acid with the first solution whereby the pH of the first solution is adjusted to about 1.5 and a silicon-molybdate complex is formed, contacting the first solution including the silicon-molybdate complex with a dextran-based material whereby the silicon-molybdate complex is adsorbed from the first solution onto the dextran-based material, washing the dextran-based material with a sufficient amount of a dilute acid solution containing at least about 25 g/l of a soluble metal halide to remove substantially all residual contaminants, separating the silicon-molybdate complex from the dextran-based material into a second solution, adding amounts of hydrogen peroxide and hydrochloric acid to the second solution sufficient to prevent reformation of the silicon-molybdate complex and to yield an oxidation state of the molybdate adapted for subsequent separation onto an anionic exchange material, contacting the second solution with an anion exchange material whereby the molybdate is retained by the anion exchange material and the silicon-32 remains in the second solution, and optionally adding sufficient alkali metal hydroxide to adjust the pH of the silicon-32 solution to about 13.

In another embodiment, the present invention provides a process for preparation of silicon-32 including contacting an irradiated potassium chloride target containing spallation products, with a sufficient amount of water, hydrochloric acid or potassium hydroxide to form a first solution containing at least about 25 g/l of potassium chloride, filtering the first solution, adjusting pH of the filtered-first solution to within a range of from about 5.5 to about 7.5, admixing sufficient molybdate-reagent and hydrochloric acid with the first solution whereby the pH of the first solution is adjusted to about 1.5 and a silicon-molybdate complex is formed, contacting the first solution including the silicon-molybdate complex with a dextran-based material whereby the silicon-molybdate complex is adsorbed from the first solution onto the dextran-based material, washing the dextran-based material with a dilute acid solution containing at least about 25 g/l of a soluble metal halide, eluting the dextran-based material with a dilute base whereby the silicon-molybdate complex and sodium-22 are separated from the dextran-based material in a second solution, admixing a solution including a molybdate-reagent, hydrochloric acid and at least about 25 grams per liter (g/l) of a soluble metal halide with the second solution whereby the pH of the second solution is adjusted to about 1.5 and a silicon-molybdate complex is formed, contacting the second solution with a second dextran-based material whereby the silicon-molybdate complex is adsorbed from the second solution onto the second dextran-based material, washing the second dextran-based material with a sufficient amount of a dilute acid solution including at least about 25 g/l of a soluble metal halide to remove substantially all of the sodium-22 from the second dextran-based material, separating the silicon-molybdate complex from the second dextran-based material into a third solution, adding amounts of hydrogen peroxide and hydrochloric acid to the third solution sufficient to prevent reformation of the silicon-molybdate complex and to yield an oxidation state of the molybdate adapted for subsequent separation onto an anionic exchange material, contacting the third solution with an anion exchange material whereby the molybdate is retained by the anion exchange material and the silicon-32 remains in the third solution, and optionally adding sufficient alkali metal hydroxide to adjust the pH of the silicon-32 solution to about 13.

The present invention further provides a silicon-32 product having a high specific activity, generally greater than about 300 Bq/microgram of silicon.

DETAILED DESCRIPTION

The present invention concerns a silicon-32 product with a high specific activity and a process of preparing a silicon-32 product, especially such a product having a high specific activity.

Aluminum-26 has been previously produced by spallation reactions of a potassium chloride target with a proton beam, followed by a suitable recovery or separation process as described by U.S. Pat. No. 5,057,269. It was not previously recognized, however, that silicon-32 is also produced in the KCl spallation reaction.

As a starting material for the process of the present invention, a potassium chloride (KCl) target is irradiated by energetic protons having energies sufficient to generate a large number of isotopes by spallation reactions, generally energies greater than about 200 MeV, more preferably from about 600 MeV to about 800 MeV. Such a proton bombardment can be accomplished by inserting the target into a linear accelerator beam at a suitable location whereby the target is irradiated, e.g., with an integrated beam intensity of from about 30 milliampere-hours (mA-hr) to about 1000 mA-hr. The proton beam used to generate the starting material for the present process was produced at the Meson Physics Facility at Los Alamos National Laboratory. There, the proton accelerator can deliver a beam of protons at an intensity of about 1 milliampere and an energy of about 800 MeV. A spallation reaction occurs when an accelerated proton from the 800 MeV beam strikes the nucleus of a target KCl atom and causes fragments of various sizes and energies to be released. In order to produce the desired quantities of the radioisotopes, the potassium chloride target should have a weight of at least about 90 grams (g).

Silicon-32 has now been discovered to be one of the fragments of the KCl target. After irradiation, the KCl target must be handled in the usual manner for radioactive substances. The target is generally allowed to decay for a minimum of from about 7 to 14 days whereby unwanted short-lived isotopes will be substantially removed. Separation of the silicon-32 from the target and from the other spallation reaction products then occurs in an isolated and shielded location referred to as a hot cell. The work is done by means of remotely controlled mechanical manipulators behind an 18 inch thick leaded glass window.

A suitable KCl target can generally weigh from about 90 grams (g) to about 100 g, although the size of the target can be varied widely. The KCl target is generally contained in a stainless steel container. Such a container can be constructed, e.g., from a 1 inch length of 3 inch diameter stainless steel pipe with stainless steel plates welded to each end of the pipe and a one half inch diameter fill hole drilled in the container for inserting KCl into the container. The KCl sample can be inserted as a solid or molten material. A stainless steel plug can be welded within the fill hole after insertion of the KCl to seal the container.

Such a KCl filled stainless steel container can then be placed into an aluminum box and placed in the path of a proton beam. Coolant, e.g., cooling water, is circulated through the aluminum box to cool the KCl during irradiation. The KCl target is generally exposed to the proton beam for from about 700 to about 800 hours although the precise time can be widely varied. Generally, an average beam current during exposure will be from about 700 to about 850 microamperes to obtain a total exposure to about at least 500,000 microampere-hours and $1.0 \times 10^{22}$ protons.

The irradiated potassium chloride target including the various spallation products is initially mixed with a sufficient volume of water, 0.1 molar (M) hydrochloric acid or 0.1M potassium hydroxide, generally a volume of from about 300 to about 1000 milliliters (ml), whereby at least a major portion of the silicon-32 is dissolved into a solution containing at least about 25 g/l potassium chloride. A solid residue including such materials as aluminum-26 will remain undissolved.

The solution including the dissolved silicon-32 is then filtered to separate any solid materials. Generally, the solution can be filtered through, e.g., a 0.45 micron Millipore membrane. In addition to the silicon-32, the solution or filtrate includes several residual contaminants such as sodium-22. At this point, the pH of the solution will be from about 1.0 to about 13.0. The pH of the solution is then adjusted as necessary to within the range of about 5.5 to about 7.5 by addition of, e.g., hydrochloric acid or potassium hydroxide.

The solution is then contacted with a suitable reagent for complexation of the silicon. Such a suitable reagent for complexation of the silicon in the solution is a molybdate reagent such as an alkali molybdate, e.g., sodium molybdate or potassium molybdate, or ammonium molybdate. Ammonium molybdate is preferred. The molybdate reagent is preferable added as a solution and a suitable solution of, e.g., ammonium molybdate can be prepared by forming a 0.015M to 0.05M molybdenum solution using ammonium molybdate in 0.2M to 0.4M hydrochloric acid, the solution further including a soluble metal halide such as sodium chloride at a concentration of about 25 g/l. The molybdate solution is generally purified or pre-treated by passing through a column of a dextran-based material to remove any stable silicon isotopes present within the solution. After contacting the solution with the molybdate reagent, the admixed materials are left in contact for sufficient time to form silicon-molybdate complexes, e.g., from about 20 minutes to about 60 minutes.

In addition to the pH adjustment, a soluble metal halide, e.g., an alkali metal halide such as an alkali metal chloride, an alkali metal bromide or an alkali metal iodide, e.g., sodium chloride, sodium iodide, sodium bromide, potassium chloride, potassium iodide, or potassium bromide, an alkaline earth metal halide such as an alkaline earth metal chloride, an alkaline earth metal bromide or an alkaline earth metal iodide, e.g., calcium chloride, calcium iodide, calcium bromide, magnesium chloride, magnesium iodide, or magnesium bromide, or a metal halide such as ferric chloride and the like, is present or added to the solution for enhanced recovery of the silicon. Preferably, the soluble metal halide is sodium chloride, potassium chloride, calcium chloride, or ferric chloride. Preferably, the soluble metal halide is present or added to the solution in amounts sufficient to yield a resultant solution containing greater than about 25 grams per liter (g/l) of the soluble metal halide. When dealing with the solution from the dissolved KCl target, such soluble metal halide concentrations will be generally present and no addition will be needed. When necessary, the soluble metal halide can be added to the solution either before or after the adjustment of the pH, but at a time prior to the subsequent contact of the solution with a dextran-based material.

Following the contact of the process solution with the molybdate reagent, the resultant solution including any silicon-molybdate complexes is then contacted with the dextran-based material. Preferably, the solution will be passed through a packed column of the dextran-based material. The silicon-32 from the solution is retained upon the dextran-based material in the form of a silicomolybdic acid complex which can be observed, e.g., by the yellow color on the column.

The dextran-based material may generally have cationic groups, anionic groups or may be free of ionic groups, and preferably is free of ionic groups. Exemplary of such dextran-based materials is Sephadex chromatographic powder, a trademarked chromatographic powder of Pharmacia Fine Chemicals, Inc., available from Pharmacia Fine Chemicals, Inc. or from Sigma Chemical Co. Generally, the dextran-based material is pre-treated by initially rinsing the material with an aqueous solution of about pH 2 containing 25 g/l of sodium chloride.

The dextran-based material including the silicon complex is then rinsed or washed with a small amount of a dilute acid, generally from 5 ml to 20 ml of 0.01M hydrochloric acid preferably including about 25 g/l of a soluble metal halide such as sodium chloride. This rinse or wash serves to wash off a portion of radioactive and stable contaminants. Generally, a sodium-22 contaminant can be separated from the silicon-32 by washing the resin with a sufficient amount of a dilute acid solution containing a soluble metal halide, e.g., a dilute HCl solution containing sodium chloride. Such a washing will be continued until no sodium-22 continues to be separated whereafter the silicon can then be separated from the molybdenum. In a preferred process of the present invention, the dextran-based material is washed with a sufficient amount of a dilute acid solution containing at least about 25 g/l of a soluble metal halide to remove substantially all residual contaminants, especially all of the sodium-22 residual contaminant.

If insufficient washing is carried out to remove substantially all of the residual contaminants, the dextran-based material will then contain the desired silicon-32 and will further include sodium-22. While not wishing to be bound by the present explanation, the sodium-22 is believed to be contained within the interstices of the resin material. In some cases, repeated initial washing may not remove all the sodium-22 from the dextran-based material. In those cases, the sodium-22 can be separated from the silicon-32 by first separating both the silicon-32 and the sodium-22 from the dextran-based material by contacting the resin material with a base such as 0.2M to 1.0M sodium hydroxide, preferably from about 0.3M to about 0.5M sodium hydroxide. Generally, such a base is passed through the column until shortly after no yellow color remains indicating the removal of all the silicon-molybdate complex. The silicon-32 can then be separated from the sodium-22 by re-adsorption of the silicon-32 onto a clean, i.e., pre-washed, dextran-based material, preferably a second pre-treated batch of such dextran-based material. The solution containing the sodium-22 and the silicon-32 is first admixed with a solution including sufficient dilute acid, e.g., about 1.0N hydrochloric acid, additional molybdate reagent and at least about 25 g/l of a soluble metal halide to yield a solution having a pH of about 1.5 and a silicon-molybdate complex. The silicon-molybdate complex containing-solution is then contacted with the second dextran-based material. As before, the silicon-32 will be adsorbed onto the dextran-based material and the sodium-22 contaminant can be separated from the silicon-32 containing dextran-based material by passing a sufficient amount of a dilute acid solution containing a metal halide, e.g., 0.01M hydrochoric acid including about 25 g/l sodium chloride, through the column until sodium-22 has been substantially completely eliminated from the column.

After separation of substantially all of the residual contaminants, the remaining silicon-molybdate complex can then be separated from the dextran-based material by contacting with a dilute base solution such as 0.2M to 1.0M sodium hydroxide, preferably from about 0.3M to about 0.5M sodium hydroxide. Generally, small portions of the base, e.g., about 2 ml portions, will be successively contacted with the dextran-based material until a time shortly after all the yellow color has been removed. Typically, a total volume of from about three to four column volumes of the dextran-based material will be sufficient to separate the complex from the resin. Small portions are preferred to yield higher concentrations of the resultant silicon-32 product.

The basic solution containing the silicon-32 is then acidified by addition of a sufficient volume of concentrated hydrochloric acid to thereby maintain separation of the silicon and molybdenum ions, i.e., to prevent reformation of the silicon-molybdate complex, and a sufficient volume of hydrogen peroxide is added to yield an oxidation state of the molybdate adapted for subsequent separation onto an anionic exchange resin. The hydrogen peroxide stock solution added can be of any convenient concentration, although concentrated solutions, i.e., solution concentrations greater than about 20 percent by weight hydrogen peroxide, are preferred. A hydrogen peroxide solution of about 30 percent by weight hydrogen peroxide is especially preferred.

The solution is then within an acid concentration whereat an anionic exchange resin is capable of adsorbing molybdate ions, generally by contact with a 4.0M to about 7.0M HCl solution, and then contacted with, preferably passed through, such an anionic exchange resin whereby the molybdate species are adsorbed by the anion exchange resin while the silicon-32 ions remain in solution and can be selectively separated. The anion exchange resin is preferably a strongly basic anion resin and preferably a non-silicon based resin and can be, for example, a resin such as AG-1 ×8, available from Bio-Rad Laboratories. Generally, the anionic exchange material is pre-treated to facilitate adsorption of the molybdate from the acidic third solution by initially rinsing the anionic exchange material with water followed by a concentrated acid solution, e.g., a 7 Normal (N) hydrochloric acid solution.

The pH of the resultant silicon-32 containing-solution can then be adjusted to a desired pH range, e.g., to a pH of about 12 to 13 by addition of a sufficient amount of a strong base such as sodium hydroxide.

Preferably in the practice of the present invention, the process is conducted in apparatus, i.e., flasks, columns and the like, essentially free of silicon to avoid introduction of other silicon isotopes to the resultant silicon-32 solution. For example, the apparatus can be comprised of plastic or may be metal. Plasticware is preferred for the apparatus used in the present process.

Generally, the resultant silicon-32 product from the present process is characterized by a high specific activity, i.e., generally greater than about 300 Becquerels (Bq) per microgram of silicon, preferably greater than about 500 Bq/microgram of silicon up to the theoretical maximum of specific activity of about $4 \times 10^6$ Bq/microgram of silicon and further characterized by the purity of the product, i.e., essentially free of other trace metal contaminants.

The present invention is more particularly described in the following examples which are intended as illustrative only, since numerous modifications and variations will be apparent to those skilled in the art.

EXAMPLE 1

Initially, a potassium chloride target, about 94 grams (g), was exposed to a proton beam. The target was contained in a stainless steel container constructed from a 1 inch length of about 3 inch diameter stainless steel pipe with stainless steel plates welded to each end of the pipe and a one half inch diameter fill hole drilled in the container for inserting KCl into the container. The KCl sample was inserted as a molten material. A stainless steel plug was welded within the fill hole after insertion of the KCl to seal the container.

The KCl filled target stainless steel container was then placed into an aluminum box and placed in the path of a proton beam. Cooling water was circulated through the aluminum box to cool the KCl during irradiation. The target was exposed to the proton beam for nearly 750 hours with an average beam current during the exposure of about 775 microamperes. The target was exposed to a total in excess of about 500,000 microampere-hours and about $1.3 \times 10^{22}$ protons.

The target was dissolved in 350 ml of 0.1N potassium hydroxide and the resulting solution was filtered through a 0.45 micron membrane filter. The filtrate was adjusted to a pH of about 6.2 by addition of concentrated HCl and then a weak acidic solution of molybdate reagent (1.0N HCl) was added until the pH was measured as 1.4 in the resulting admixture.

The molybdate reagent had been previously prepared using 4.0 g of $(NH_4)_6Mo_7O_{24}.4H_2O$, 12.5 g of NaCl, 12 ml of 12M HCl and 488 ml of deionized water. The molybdate reagent was passed through a three ml bed volume column of a dextran-based resin (Sephadex G-25 from Pharmacia Fine Chemicals, Inc.) which had been pre-rinsed with about 20 ml of 0.01 N HCl containing 25 g/l of NaCl. This pre-treatment of the molybdate reagent with the dextran-based resin was intended to remove any stable silicon from the reagent prior to the use in separating the silicon-32.

The resultant admixture of the filtrate and acidic solution of molybdate reagent was then passed through a column of 1 g of a dextran-based resin (Sephadex G-25 from Pharmacia Fine Chemicals, Inc.) which had been pre-rinsed with about 20 ml of 0.01N HCl containing 25 g/l of NaCl. The yellow heteropolysilicomolybdic acid species were retained by the resin. The resin was then rinsed with a dilute HCl solution containing about 25 g/l of sodium chloride to remove some contaminants. The silicon (as complexes with the molybdate) was removed from the resin by contacting with from about 20 to about 25 ml of 0.4M sodium hydroxide.

The resulting solution was then mixed with about 6 ml of 1.0N HCl and 12 ml of the molybdate reagent as previously described to yield a solution with a pH of about 1.38. This solution was passed through a 1.5 ml resin bed column of fresh, pre-washed dextran-based material. Again, the yellow heteropolysilicomolybdic acid species were retained by the resin. The resin was then washed repeatedly with 2.0 ml increments of a 0.01N HCl solution containing 25 g/l of NaCl until no additional sodium-22 eluted from the resin bed as determined by gamma ray spectroscopy. The remaining silicon-32 (as complexes with the molybdate) was then removed from the resin by contacting with four 2 ml portions of 0.4M sodium hydroxide.

The resulting solution was mixed with an equal volume of 12N HCl followed by addition of 25 microliters of 30% by weight hydrogen peroxide. This solution was then passed through a 10 ml column of anionic exchange resin (BioRad AG-1 $\times$8, 100–200 mesh anion exchange resin) whereby the molybdenum was retained by the resin and the silicon-32 remained in solution. The resultant product, i.e., the concentrated solution of silicon-32, included 1190 micromoles per liter of silicon, had a specific activity of about 520 Becquerels per microgram of silicon, and was of high purity with measured stable element concentrations of less than 1 ppm aluminum, about 3.5 ppm calcium, less than 1 ppm copper, about 1.1 ppm iron, about 0.7 ppm magnesium, less than 0.5 ppm molybdenum and undetectable zinc.

The solution was finally mixed with a sufficient amount of 50% sodium hydroxide to yield a basic solution for storage thereby avoiding potential problems with polymerization of the silicon.

Although the present invention has been described with reference to specific details, it is not intended that such details should be regarded as limitations upon the scope of the invention, except as and to the extent that they are included in the accompanying claims.

What is claimed is:

1. A process for preparation of a high purity, high specific activity silicon-32 solution comprising:
    contacting an irradiated potassium chloride target containing spallation products with a sufficient amount of water, hydrochloric acid or potassium hydroxide to form a first solution;
    filtering the first solution;
    adjusting pH of the first solution to within a range of from about 5.5 to about 7.5;
    admixing a sufficient amount of a molybdate-reagent and a dilute acid with the first solution whereby the pH of the first solution is adjusted to about 1.5 and a silicon-molybdate complex is formed;
    contacting the first solution including the silicon-molybdate complex with a dextran-based material whereby the silicon-molybdate complex is adsorbed from the first solution onto the dextran-based material;
    washing the dextran-based material with a sufficient amount of a dilute acid containing a soluble metal halide to remove substantially all residual contaminants;
    separating the silicon-molybdate complex from the dextran-based material into a second solution;
    adding amounts of hydrochloric acid and hydrogen peroxide to the second solution sufficient to maintain separation of the silicon and molybdate ions and to yield an oxidation state of the molybdate adapted for subsequent separation onto an anionic exchange material; and,
    contacting the second solution with an anion exchange material whereby the molybdate is retained by the anion exchange material and the silicon remains in the second solution.

2. The process of claim 1 further comprising adding sufficient alkali metal hydroxide to adjust the pH of the second solution to about 12 to 13.

3. The process of claim 1 wherein the molybdate-reagent is ammonium molybdate.

4. The process of claim 1 wherein the molybdate-reagent is substantially free of silicon.

5. The process of claim 1 wherein the metal halide is sodium chloride.

6. The process of claim 1 wherein the process is conducted in apparatus essentially free of silicon.

7. The process of claim 1 wherein the process is conducted in apparatus comprised of plastic.

8. A process for preparation of a high purity, high specific activity silicon-32 solution comprising:
    contacting an irradiated potassium chloride target containing spallation products with a sufficient amount of water, hydrochloric acid or potassium hydroxide to form a first solution;

filtering the first solution;

adjusting pH of the first solution to within a range of from about 5.5 to about 7.5;

admixing a sufficient amount of a molybdate-reagent and a dilute acid with the first solution whereby the pH of the first solution is adjusted to about 1.5 and a silicon-molybdate complex is formed;

contacting the first solution including the silicon-molybdate complex with a dextran-based material whereby the silicon-molybdate complex is adsorbed from the first solution onto the dextran-based material;

washing the dextran-based material with a sufficient amount of a dilute acid containing a soluble metal halide to remove substantially all residual contaminants except sodium-22;

eluting the dextran-based material with a dilute base whereby the silicon-molybdate complex and sodium-22 are separated from the dextran-based material in a second solution;

admixing a solution including a sufficient amount of a molybdate-reagent, a dilute acid, and a soluble metal halide, with the second solution whereby the pH of the second solution is adjusted to about 1.5 and the metal halide concentration is at least about 25 g/l and a silicon-molybdate complex is formed;

contacting the second solution with a second dextran-based material whereby the silicon-molybdate complex is adsorbed from the second solution onto the second dextran-based material;

washing the second dextran-based material with an amount of a dilute acid solution containing at least about 25 g/l of a soluble metal halide, said amount of solution sufficient to remove substantially all of the sodium-22 from the second dextran-based material;

separating the silicon-molybdate complex from the dextran-based material into a third solution;

adding amounts of hydrochloric acid and hydrogen peroxide to the third solution sufficient to maintain separation of the silicon and molybdate ions and to yield an oxidation state of the molybdate adapted for subsequent separation onto an anionic exchange material; and, contacting the third solution with an anion exchange material whereby the molybdate is retained by the anion exchange material and the silicon remains in the third solution.

9. The process of claim 8 further comprising adding sufficient alkali metal hydroxide to adjust the pH of the third solution to about 12 to 13.

10. The process of claim 8 wherein the molybdate-reagent is ammonium molybdate.

11. The process of claim 8 wherein the molybdate-reagent is substantially free of silicon.

12. The process of claim 8 wherein the metal halide is sodium chloride.

13. The process of claim 8 wherein the process is conducted in apparatus essentially free of silicon.

14. The process of claim 8 wherein the process is conducted in apparatus comprised of plastic.

* * * * *